United States Patent Office 3,699,083
Patented Oct. 17, 1972

3,699,083
THIOGLYCOLATE CATALYSIS OF PREPARATION OF POLYESTERS
Yuzi Okuzumi, Akron, Ohio, assignor to The Goodyear Tire & Rubber Company, Akron, Ohio
No Drawing. Filed Aug. 22, 1969, Ser. No. 852,510
Int. Cl. C08g 17/013
U.S. Cl. 260—75 R        2 Claims

ABSTRACT OF THE DISCLOSURE

Polymeric linear polyesters are prepared by subjecting at least one bis ester of a dicarboxylic acid to alcoholysis in the presence of an excess of a glycol and a catalytic amount of a compound of the general formula

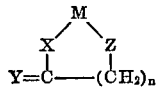

where X and Y are oxygen or sulfur, Z is sulfur, $n$ is 1, 2, 3 or 4, and M is a divalent metal selected from the group consisting of magnesium, calcium, strontium, barium, manganese, zinc and cadmium, with the subsequent removal of glycol.

---

This invention relates to the preparation of glycol esters of polycarboxylic acids. More particularly this invention relates to the preparation of polymeric glycol esters of dicarboxylic acids and to an improvement in the method of preparing linear superpolyesters by the alcoholysis of esters of dicarboxylic acids with a glycol and the subsequent polymerization of these glycol esters to high polymeric linear polyesters.

In the preparation of linear superpolyesters, one of the most satisfactory methods from the standpoint of simplicity of reaction and economy of operation has been the ester interchange method in which esters of polycarboxylic acids are reacted with a glycol to form the glycol ester of the acid or a low molecular weight polymeric polyester which is then polymerized to a high molecular weight polymeric polyester by a condensation reaction with splitting out of glycol. This process, however, has not been entirely satisfactory because the initial ester interchange or alcoholysis reaction is slow and because most of the materials that catalyze this reaction are not effective catalysts for the subsequent condensation reaction.

In order to prepare linear polyesters of high molecular weight it is necessary to use materials of high purity because some impurities interfere with the condensation reaction and lower the degree of polymerization to which the glycol ester can be polymerized. Very pure esters, however, do not undergo the alcoholysis reaction with pure glycols as readily as do these materials containing some impurities. Consequently, it has been necessary to find a material which will effectively catalyze the ester interchange of pure esters with pure glycols, and which will not adversely affect the condensation reaction so that high molecular weight polyesters can be formed in a reasonable time. Preferably the catalyst for the initial ester interchange reaction should also be a catalyst for the condensation reaction.

Heretofore, various materials have been proposed as catalysts for the ester interchange reaction between glycols and esters of polycarboxylic acids and for the subsequent polymerization reaction. Metals in the form of powder, chips, ribbon or wire have been suggested, as have surface catalysts such as broken glass or silica gel. The more successful of the catalysts used in the past, however, have been the alkaline materials such as the alkali metal and alkaline earth metal alcoholates, the alkali metal carbonates, or other alkaline reacting salts, alkaline earth oxides and litharge.

Many of these materials are effective catalysts for the initial, simple ester interchange, and some of them catalyze the condensation reaction. However, there are certain disadvantages to using insoluble materials due primarily to the nature of their physical or chemical properties. The metals and surface catalysts being present in the form of solids, incompatible with the polymer, must be removed before the polymer can be used in applications such as fibers, coatings or films. Removal of solid particles from very viscous materials such as these high molecular weight polyesters is extremely difficult. Salts or alkoxide compounds of a metal selected from the Groups I to VII of the Periodic Chart have been widely used as catalysts for the preparation of polyester. These catalysts, however, often give color formation and undesirable by-products during polycondensation.

According to the present invention it has been found that compounds of the general formula

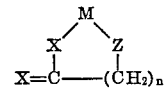

where X, Y and Z are oxygen or sulfur, $n$ is 1, 2, 3 or 4, M is a divalent metal selected from the group consisting of magnesium, calcium, strontium, barium, manganese, zinc and cadmium, catalyze the ester interchange between glycols and esters of dicarboxylic acids and the subsequent polymerization of the product and permit the formation in relatively short reaction times of highly polymeric linear polyesters.

Thus an ester of a dicarboxylic acid such as dimethyl terephthalate can be reacted with a glycol such as ethylene glycol and the resultant glycol ester condensed to form a highly polymeric linear polyester, both stages of the reaction being carried out in the presence of a compound of the general formula

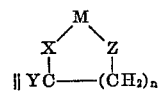

where X and Y are oxygen or sulfur, Z is sulfur, $n$ is 1, 2, 3 or 4, and M is a divalent metal selected from the group consisting of magnesium, calcium, strontium, barium, manganese, zinc and cadmium. The bis glycol ester may be prepared by any suitable method, if desired, such as by reacting the sodium or potassium salt of the acid with ethylene chlorohydrin or by reacting the acid with ethylene oxide or a large excess of the glycol, or by glycolysis of bis esters of the dicarboxylic acid with an excess of glycol using some catalyst which is a catalyst for the ester interchange but which is not a catalyst for the polymerization reaction and the bis glycol ester or a low molecular weight polymer thereof can then be polymerized according to the usual known techniques using the catalysts of this invention.

The following examples in which parts and percentages referred to are by weight illustrate the invention.

EXAMPLE 1

A glass reaction tube approximately 35 centimeters long having an inside diameter of 38 millimeters equipped with a side arm, a nitrogen gas inlet tube and a stirrer was charged with 50 parts of dimethyl terephthalate, 40 parts of ethylene glycol and catalyst as indicated in the table below. Nitrogen gas was slowly passed over the mixture and the mixture was heated by means of a vapor bath at 240° C. and stirred for one hour, after which the alcoholysis reaction was essentially complete. Then 0.015 part of antimony oxide was added to the reaction mixture and polymerization continued at a temperature of 280° C. and a pressure of 0.05 millimeter of mercury pressure for two hours while the excess glycol was distilled out. The results obtained with the various catalysts are set out in Table I below. In Table I tthe figures in the catalyst columns indicate the parts by weight of catalyst used.

EXAMPLE 2

The same procedure as in Example 1 was followed except that the catalyst was different. This is shown in Table I.

TABLE I

| Example | Magnesium monocyclic glycolate | Calcium monocyclic thioglycolate | Polymer intrinsic viscosity | Polymer color |
|---|---|---|---|---|
| 1 | 0.02 | | 0.640 | Colorless. |
| 2 | | 0.05 | 0.780 | Do. |

EXAMPLE 3

To further test the catalyst of the invention a large batch of polyester was made according to the following example.

Fifteen parts of dimethyl terephthalate, 11 parts of ethylene glycol, 0.006 part of manganese monocyclic thioglycolate and 0.0032 part of antimony trioxide were charged into a five gallon stainless steel reactor, which was equipped with a stirrer, a distilling column and a temperature measuring device. The mixture was heated and stirred at 145° C. and the temperature of the mixture was slowly raised to 245° C. as methanol distilled out. Approximately the theoretical amount of methanol was distilled out of the reaction vessel, showing the ester interchange reaction to be complete in 1½ hours. The temperature of the mixture was then raised to 270° C. and the pressure was slowly reduced to one millimeter of mercury pressure. The condensation reaction was run at 280° C. and one millimeter of mercury pressure for 1¾ hours. The polyester formed was colorless and had an intrinsic velocity of 0.62.

The term intrinsic viscosity is used herein as a measure of the degree of polymerization of the polymer. It is defined as follows:

$$\text{limit } \frac{\ln \eta_r}{C} \text{ as C approaches 0}$$

wherein $\eta_r$ is the viscosity of a dilute 60/40 phenol/tetrachloroethane mixed solvent solution of the polymer divided by the viscosity of the 60/40 phenol/tetrachloroethane mixed solvent itself measured under the same conditions as the copolyester solution and C is the concentration of the polyester in grams per 100 cubic centimeters of solution. The intrinsic viscosity data for the table above were obtained by determining the viscosity of a solution of 0.4 gram of the polyester dissolved in 100 cubic centimeters of the 60/40 phenol/tetrachloroethane solvent at 30.0° C.

The examples given illustrate the invention particularly with respect to the dimethyl esters and ethylene glycol. The invention will also work effectively with other esters of dicarboxylic acids such as the ethyl, propyl, butyl and phenyl esters. Other glycols such as the propylene glycols, the butylene glycols, pentamethylene glycol, hexamethylene glycol, decamethylene glycol, diethylene glycol, cyclohexane dimethanol and 2,2-bis[4(β-hydroxyethoxy)phenyl] propane can be used, although ethylene glycol is preferred because of its low cost and ready availability.

In the practice of the invention the preparation of the glycol ester and its subsequent polymerization is, in general, carried out in accordance with the usual known techniques. Thus, the reaction is preferably carried out in the absence of oxygen, generally in an atmosphere of an inert gas such as nitrogen or the like, in order to lessen darkening and to make it possible to obtain a high molecular weight pale or colorless product.

The invention has been illustrated with particular respect to the preparation of polymeric ethylene terephthalate. Ethylene isophthalate, ethylene terephthalate-ethylene isophthalate copolyesters and polymeric polyesters derived from other dicarboxylic acids and glycols can be prepared using the catalysts of the invention. Representative examples of such acids from which the polyesters can be derived are aliphatic dicarboxylic acids such as adipic acid, sebacic acid and azelaic acid; aromatic dicarboxylic acids such as orthophthalic acid, isophthalic acid, terephthalic acid, 2,5-dichloro terephthalic acid, bibenzoic acid and the naphthalic acids.

The examples have illustrated the invention with respect to certain particular catalysts of this invention. Various other catalysts within the above cited general formula may be used. Representative examples of such materials are monocyclic glycolates of calcium, barium, strontium, zinc and manganese, monocyclic thioglycolates of magnesium, barium, strontium, zinc and manganese, calcium monocyclic glycolate, barium monocyclic glycolate, strontium monocyclic glycolate, zinc monocyclic glycolate, manganese monocyclic glycolate, magnesium monocyclic thioglycolate, barium monocyclic thioglycolate, strontium monocyclic thioglycolate, zinc monocyclic thioglycolate and manganese monocyclic thioglycolate.

Although the catalysts of this invention may be used as the sole catalyst for both the ester interchange and condensation reactions, an auxiliary catalyst used in combination with the catalysts of this invention for the polycondensation reaction gives better results. A particularly effective auxiliary catalysts is a glycol soluble antimony compound. Representative examples of glycol soluble antimony compounds are antimony acetate, antimony trioxide and antimony glycolate.

The amount of catalyst used may be varied over wide concentrations. As is usual with catalysts, the amount will ordinarily be relatively small. As a general rule the amount will be such that the catalyst is within the range of from 0.0001 to 0.1 weight percent based on the dialkyl ester used. The preferred amount of catalyst is within the range containing from 0.005 to 0.08 weight percent based on the dialkyl ester used to give a satisfactory reaction rate and a product of suitable viscosity and color. The high molecular weight polymer product produced with the catalyst of the invention will have an intrinsic viscosity of at least 0.3 and generally 0.4 or higher as measured in the 60/40 phenol/tetrachloroethane mixed solvent.

While certain representative embodiments and details have been shown for the purpose of illustrating the invention it will be apparent to those skilled in this art that various changes and modifications may be made therein without departing from the spirit or scope of the invention.

What I claim is:

1. In a process for preparing a highly polymeric linear polyester by subjecting at least one bis ester of a dicarboxylic acid to alcoholysis in the presence of an excess of a glycol and thereafter subjecting the bis glycol ester formed to self-condensation with the removal of glycol, the improvement which comprises carrying out the alcoholysis in the presence of a catalyst selected from the group consisting of calcium monocyclic thioglycolate and magnesium monocyclic thioglycolate.

2. The process of claim 1 wherein an auxiliary catalyst selected from the group consisting of antimony acetate, antimony trioxide and antimony glycolate is used in combination with the ester interchange catalysts during the condensation.

References Cited

UNITED STATES PATENTS 3,428,587  2/1969  Piirma ............... 260—22

OTHER REFERENCES

Wilfong, J. Polymer Sci. 54, 388–89 (1961).

MELVIN GOLDSTEIN, Primary Examiner

U.S. Cl. X.R.

260—755, 475 P

PO-1050
(5/69)

UNITED STATES PATENT OFFICE
CERTIFICATE OF CORRECTION

Patent No. 3,699,083                                Dated  October 17, 1972

Inventor(s)    Yuzi Okuzumi

It is certified that error appears in the above-identified patent and that said Letters Patent are hereby corrected as shown below:

Column 2, line 35 "where X, Y and Z are oxygen or sulfur"

should be -- where X and Y are oxygen, Z is sulfur --.

Line 52, the formula appears as:

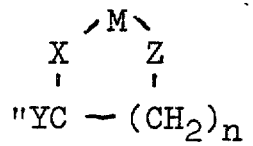

and should appear as follows:

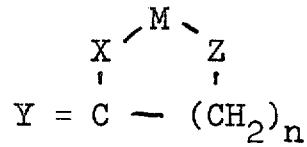

Signed and sealed this 10th day of July 1973.

(SEAL)
Attest:

EDWARD M. FLETCHER, JR.            Rene Tegtmeyer
Attesting Officer                  Acting Commissioner of Patents